UNITED STATES PATENT OFFICE.

FERDINAND ZEILER, OF NEW MARKET, VIRGINIA.

COMPOSITION FOR PRESERVING EGGS, &c.

SPECIFICATION forming part of Letters Patent No. 379,262, dated March 13, 1888.

Application filed May 25, 1887. Serial No. 239,304. (No specimens.)

*To all whom it may concern:*

Be it known that I, FERDINAND ZEILER, a citizen of the United States, residing at New Market, in the county of Shenandoah and State of Virginia, have invented a new and useful Composition of Matter, to be used more especially for the preservation of eggs, although also applicable for preserving fish, meat, and other articles, of which the following is a specification.

My composition consists of the following ingredients, combined in the proportions stated, viz: pure water, about one gallon; chloride of calcium, about four ounces; boracic acid, about one ounce; helenin, which is from inula or elecampane, one ounce. These ingredients are to be thoroughly mingled by agitation.

In using the above-named composition the eggs are introduced therein, taking care that those that float therein are separated from the good ones. For transportation by rail or water it is preferable to place them in cases or boxes containing partitions to prevent their agitation.

If it is desired to employ the composition for preserving fish, meat, or similar articles, they are first dipped into said composition several times, and then exposed to the atmosphere. In case of very large fish or very large pieces of meat it is advisable to immerse them in the composition for some time before exposing them to the atmosphere; or they may be inclosed in suitable fabrics saturated with the composition.

This composition is applicable also for the preservation of oysters, lobsters, crabs, fruit, and vegetables without injury to any of said articles or deleterious effect to the health. Cheese can also be surrounded or inclosed in cotton or other material saturated with the composition, and will be preserved in a perfect state.

If desired, the composition can be used without the two latter ingredients with good effect.

Having thus described my composition, what I claim, and desire to secure by Letters Patent of the United States, is—

The herein-described composition of matter, to be used for the preservation of articles named, consisting of water, chloride of calcium, boracic acid, and helenin, in about the proportions specified.

FERDINAND ZEILER.

Witnesses:
WM. H. WETZEL,
AARON S. LEINBACH.